(12) United States Patent
Tehrani

(10) Patent No.: US 6,183,089 B1
(45) Date of Patent: Feb. 6, 2001

(54) MOTION PICTURE, TV AND COMPUTER 3-D IMAGING SYSTEM AND METHOD OF USE

(76) Inventor: Hossein Tajalli Tehrani, 1950 Camino De Las Roina #115, San Diego, CA (US) 92108

( * ) Notice: Under 35 U.S.C. 154(b), the term of this patent shall be extended for 0 days.

(21) Appl. No.: 09/416,903

(22) Filed: Oct. 13, 1999

Related U.S. Application Data

(60) Provisional application No. 60/104,034, filed on Oct. 13, 1998.

(51) Int. Cl.$^7$ .................................................. G02B 27/22
(52) U.S. Cl. ................................. 353/7; 353/10; 352/61; 359/464
(58) Field of Search .................................. 353/7, 10, 38; 359/463, 464, 478; 348/60, 54, 51; 352/60, 61, 57

(56) References Cited

U.S. PATENT DOCUMENTS

| | | | |
|---|---|---|---|
| 4,006,291 | 2/1977 | Imsand | 358/92 |
| 4,248,501 | 2/1981 | Simpson . | |
| 4,323,920 | 4/1982 | Collender | 358/88 |
| 4,367,486 | 1/1983 | Eichenlaub | 358/88 |
| 4,393,400 | 7/1983 | Ikushima et al. | 358/92 |
| 4,562,463 | 12/1985 | Lipton | 358/88 |
| 4,669,812 | 6/1987 | Hoebing . | |
| 4,717,949 | 1/1988 | Eichenlaub | 358/3 |
| 4,772,944 | 9/1988 | Yoshimura | 358/92 |
| 4,872,750 | * 10/1989 | Morishita | 353/7 |
| 4,911,530 | * 3/1990 | Lo . | |
| 5,146,246 | * 9/1992 | Marks | 353/7 |
| 5,537,144 | 7/1996 | Faris | 358/58 |
| 5,751,479 | * 5/1998 | Hamagishi et al. | 359/464 |
| 5,782,547 | 7/1998 | Machtig . | |
| 5,835,133 | * 11/1998 | Moreton et al. | 348/51 |
| 5,886,816 | * 3/1999 | Faris | 353/8 |
| 5,930,037 | * 6/1999 | Imai | 359/463 |

* cited by examiner

Primary Examiner—William Dowling
(74) Attorney, Agent, or Firm—Eric Karich

(57) ABSTRACT

A 3-D imaging system for projecting a 3-D panoramic illusion of an object to a viewer has two primary components: a camera having a pair of horizontally spaced anamorphic lenses capable of viewing and capturing a wide angle panoramic view of the object as a 2-D double-squeeze image; and a projector such as a movie projector or CRT for projecting the 2-D double-squeeze image through an image separator layer to the viewer, causing the viewer to perceive the wide angle panoramic view of the object as the 3-D panoramic illusion located in front of the image separator layer. The first anamorphic lens has a red transparent color filter for removing blue light, forming a red color filter image of the object. The second anamorphic lens has a blue transparent color filter for removing red light, forming a blue color filter image of the object. The red and blue color filter images are captured together as the 2-D double-squeeze image. The 2-D double-squeeze image is then projected by the projector through the image separator layer. The image separator layer is responsible for separating the red and blue color filter images from the 2-D double-squeeze image and directing the red color filter image to one of the viewer's eyes and the blue color filter image to the other of the viewer's eyes, thereby reproducing the light captured by the camera and creating the 3-D panoramic illusion of the object, the 3-D panoramic illusion being stretched from opposite sides into a wide angle panoramic image.

17 Claims, 5 Drawing Sheets

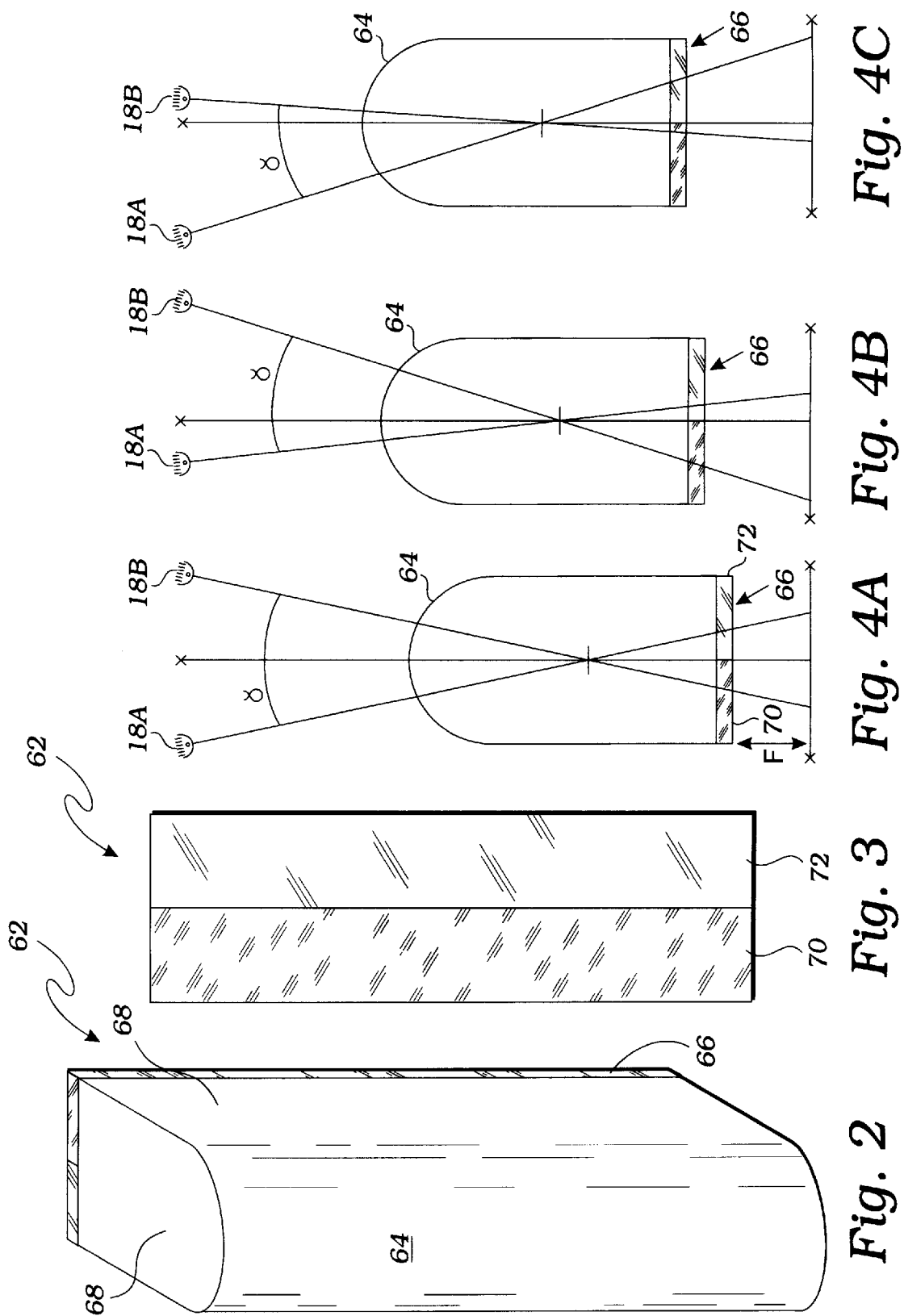

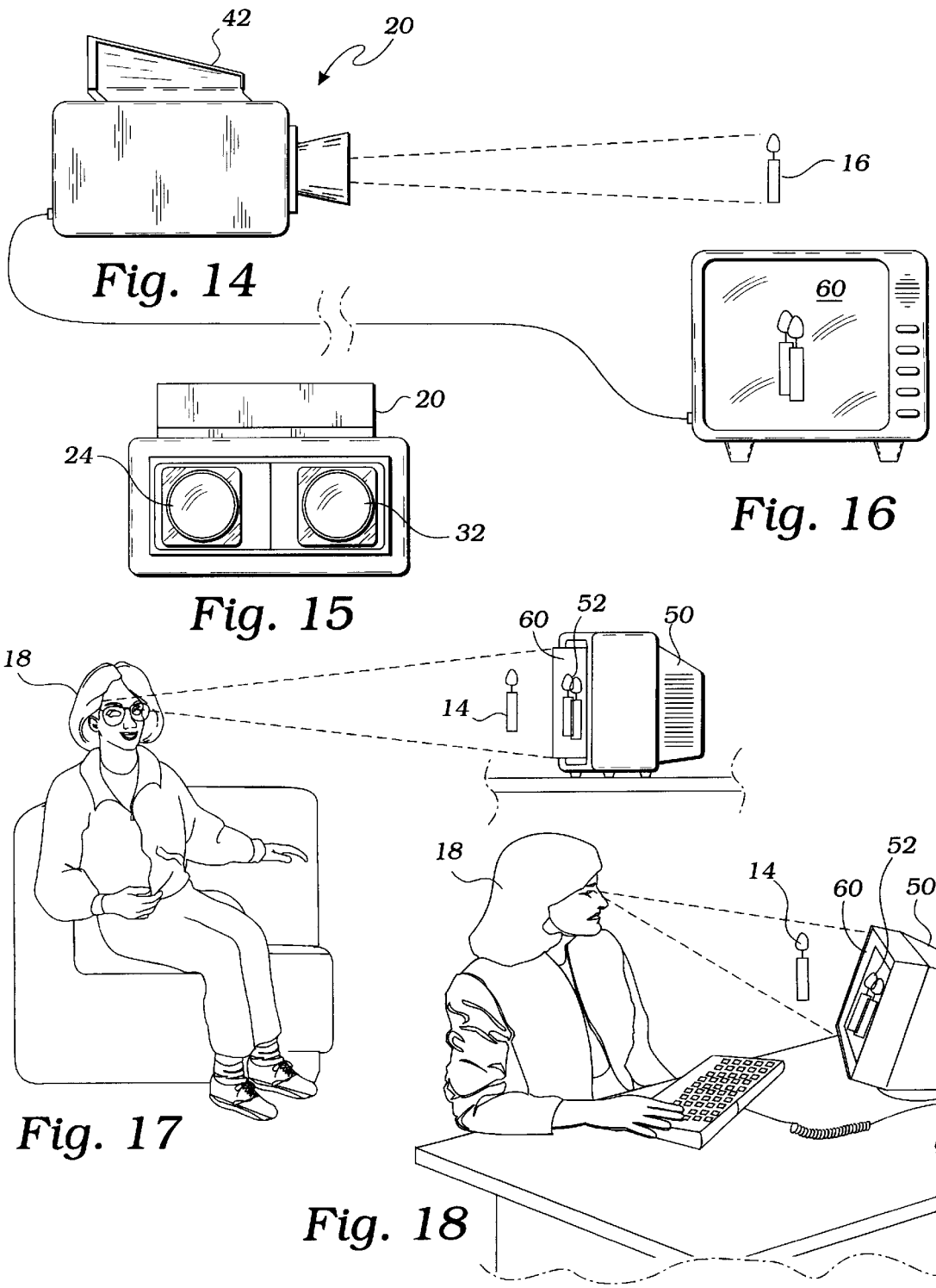

MOTION PICTURE, TV AND COMPUTER 3-D IMAGING SYSTEM AND METHOD OF USE

This application for a utility patent claims the benefit of U.S. Provisional Application Ser. No. 60/104,034, filed Oct. 13, 1998.

BACKGROUND OF THE INVENTION

1. Field of the Invention

This invention relates generally to a 3-D imaging system, and more particularly to a motion picture, television (TV), and computer 3-D imaging system for projecting 3-D panoramic images of an object to a viewer with standard equipment and without the use of special glasses.

2. Description of Related Art

The phenomenon of creating the appearance of 3-D images is known to those skilled the art. First, an object is photographed or filmed from specific right and left angles simulating the pair of human eyes. Then, when viewing the picture that has been captured from the right angle with the right eye, and the picture that has been shot from the left angle with the left eye, the mind of the viewer perceives a 3-D image with depth and focus. The following art defines the present state of this field:

Eichenlaub, U.S. Pat. No. 4,717,949 discloses a flat screen 3-D display for bright wide angle 3-D images employs a flat screen on which are displayed a plurality of thin, vertical light emitting lines. A light valve located in front of the screen forms images by varying the transparency of individual pixels arranged in a raster pattern across its surface. The screen and light valve are arranged in such a way that an observer sees the light emitting lines through one set of pixels with the left eye and the same lines through a different set of pixels with the right eye.

Eichenlaub, U.S. Pat. No. 4,367,486 discloses reflected illuminating radiation that is transmitted through a restricted window in an opaque surface undergoing scanning movement to project an image pattern on a closely spaced imaging surface from which the image pattern is reproduced on a viewing screen. The viewing screen is locally variable in transparency to provide images of objects viewed by observers with parallax.

Yoshimura, U.S. Pat. No. 4,772,944 discloses a 3-D image signal processing device which provides that, while a 3-D image signal in the form of a plurality of types of time-divisionally multiplexed image information signals is input thereto, a prescribed one of the plurality of types of image information signals is sampled from the input 3-D image signal by detecting the time of changeover between any two types of all the image information signals, and is memorized so that, by using the memorized image information signal, only the prescribed type of image information signal is output.

Lipton, U.S. Pat. No. 4,562,463 discloses a 3-D television system comprising single or double camera designs adapted to televise twin perspective points of view, which are the source for encoding alternate odd and even fields with right and images, and a television receiver for displaying such images with either passive or infra-red signaled or internally clock controlled active selection devices. The receiver and the embodiment of the camera use field storage devices to record picture information in an appropriate sequence in such a manner to eliminate flicker and to overcome spurious temporal parallax effects. The receiver uses monochromatic or color television tubes, like those of present manufacture, but employs means to double the scan rate so that, for example, an effective 60 fields for each eye for domestic receivers, and 50 fields for each eye, for certain foreign receivers, is achieved. Field storage of buffer circuits allow the doubling of the number of fields without doubling the bandwidth. The receiver incorporates circuits for charging and synchronizing the phase of electro-optical shutters in individual selection devices of the active kind, or for activating an electro-optical material overlaid on the CRT which can rotate polarization in synchronization with the right and image fields to operate in conjunction with polarized selection devices of the passive kind.

Ikushima et al., U.S. Pat. No. 4,393,400 discloses a flickerless 3-D TV viewing system that is designed to be used with a single TV receiver set and with a set of 3-D glasses composed of light shutters. The system includes a signal-distributor, a set of memory devices, a signal-selector, a synchronous signal separator, a discriminator and a timing circuit. the system is very comfortable for the viewer during 3-D TV viewing.

Faris, U.S. Pat. No. 5,537,144 discloses an electro-optical display system for visually displaying a polarized spatially multiplexed image (SMI) of a 3-D object for use in 3-D viewing thereof with high image quality and resolution. In the illustrative embodiment, electro-optical display system comprises a liquid crystal display device and micropolarization panel of electrically-passive construction. The liquid crystal display device has a display surface for visually displaying a composite pixel pattern representative of a spatially multiplexed image composed of first and second spatially modulated perspective images of the object, consisting of first and second pixel patterns. The micropolarization panel includes an optically transparent laminate portion and an optically transparent substrate portion which is in direct physical contact with the laminate portion. First and second optically transparent patterns are permanently formed I the optically transparent laminate portion. The first optically transparent pattern spatially corresponds to and is spatially aligned with the first pixel pattern displayed on the display surface so as to impart a first polarization state P1 to light emanating from the first pixel pattern and passing through the first optically transparent pattern. The second optically transparent pattern spatially corresponds to and is spatially aligned with the second pixel pattern displayed on the display surface so as to impart a second polarization state P2 to light emanating from the second pixel pattern and passing through the second optically transparent pattern.

Imsand, U.S. Pat. No. 4,006,291 discloses a method and apparatus for producing a three dimensional television image by presenting stereoptican pairs of images to the viewers eyes. One of the stereoptican partners is presented most of the time while the second stereoptican partner is flashed on and off rapidly. Under the proper conditions with the second stereoptican partner being flashed on for a suitably short period of time at the proper repetition rate, the viewer is not consciously aware of its presence and effectively perceives the picture as a three dimensional image.

Collender, U.S. Pat. No. 4,323,920 discloses a 3-D television without glasses having horizontal parallax and operating over standard single channel bandwidth which is implemented by using two television cameras aligned in the same plane, 2:1 bandwidth compression and a receiver that processes the two views one scan line at a time using successive element correlation within common scan lines to synthesize N views in-between the two received views. The television receiver/projector contains an optical scanner with a central projection lamp, N+2 small full frame Charge Couple Device Liquid Crystal Light Valve (CCDLCLV) televiews of the scene. N+2 views are sequentially projected by the optical scanner to a semi-specular screen that returns all projected light to a horizontally moving vertical aerial exit slit (having no physical properties) resulting in the accurate reconstruction of continuous scene horizontal parallax for simultaneous view by several observers.

Projecting an image so that it appears to project outwards from the TV or other display screen is also known in the art. Machtig at al., U.S. Pat. No. 5,782,547 discloses a magnified background image spatial object display that exploits a mental trick to create the illusion of a projected image in front of the device. The display uses a projection device such as a CRT to project an image through a convex lens, preferably a Fresnel lens. The Fresnel lens inverts the image and creates the illusion that the image is actually projected in front of the display.

The prior art teaches 3-D imaging technology. However, the prior art does not teach a 3-D technology that uses existing technology and does not require the viewer to wear special glasses. The prior art also does not teach a 3-D system that provides a panoramic image from an ordinary TV or other display. The present invention fulfills these needs and provides further related advantages as described in the following summary.

SUMMARY OF THE INVENTION

The present invention teaches certain benefits in construction and use which give rise to the objectives described below.

The present invention provides a 3-D imaging system for projecting a 3-D panoramic illusion of an object to a viewer. The 3-D imaging system includes two primary components: a camera having a pair of horizontally spaced anamorphic lenses capable of viewing a wide angle panoramic view of the object and capturing the wide angle panoramic view as a 2-D double-squeeze image; and a projector such as a movie projector or CRT for projecting the 2-D double-squeeze image through an image separator layer to the viewer, causing the viewer to perceive the wide angle panoramic view of the object as the 3-D panoramic illusion located in front of the image separator layer. The horizontally spaced anamorphic lenses have a red transparent color filter for removing blue light, forming a red color filter image of the object. The second anamorphic lens has a blue transparent color filter for removing red light, forming a blue color filter image of the object. The red and blue color filter images are captured together as the 2-D double-squeeze image. The 2-D double-squeeze image is then projected by the projecting means through the image separator layer. The image separator layer is responsible for separating the red color filter image and the blue color filter image from the 2-D double-squeeze image and directing the red color filter image to one of the viewer's eyes and the blue color filter image to the other of the viewer's eyes, thereby reproducing the wide angle panoramic view captured by the camera and creating the 3-D panoramic illusion of the object. The image separator layer also causes the viewer to perceive the 3-D panoramic illusion as projected in front of the image separator layer and stretched from opposite sides into a wide angle panoramic image.

A primary objective of the present invention is to provide a motion picture, TV and computer 3-D imaging system having advantages not taught by the prior art.

Another objective is to provide a 3-D technology that projects a 3-D image to a viewer without requiring the viewer to wear special glasses.

Another objective is to provide a 3-D technology that provides a panoramic image from an ordinary TV or other display.

A further objective is to provide a 3-D technology that can be viewed with a standard motion picture, CRT television, computer LCD system.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 2 is a perspective view of a lenticule used to create the image separator layer;

FIG. 3 is a rear elevational view thereof;

FIG. 4A is a top plan view thereof showing a viewer perfectly positioned for viewing the 3-D panoramic illusion generated by the lenticule;

FIG. 4B is a top plan view thereof showing the viewer shifted to the left but still within the viewing angle of the lenticule;

FIG. 4C is a top plan view thereof showing the viewer shifted to the right but still within the viewing angle of the lenticule;

FIG. 14 is a side elevational view of a camcorder-style camera;

FIG. 15 is a front elevational view thereof;

FIG. 16 is a front elevational view of a CRT television embodying the present invention;

FIG. 17 is a side elevational view of a viewer viewing the CRT television; and

FIG. 18 is a side elevational view of a viewer viewing a computer having an LCD display, the LCD display embodying the present invention.

DETAILED DESCRIPTION OF THE INVENTION

Figure 1:
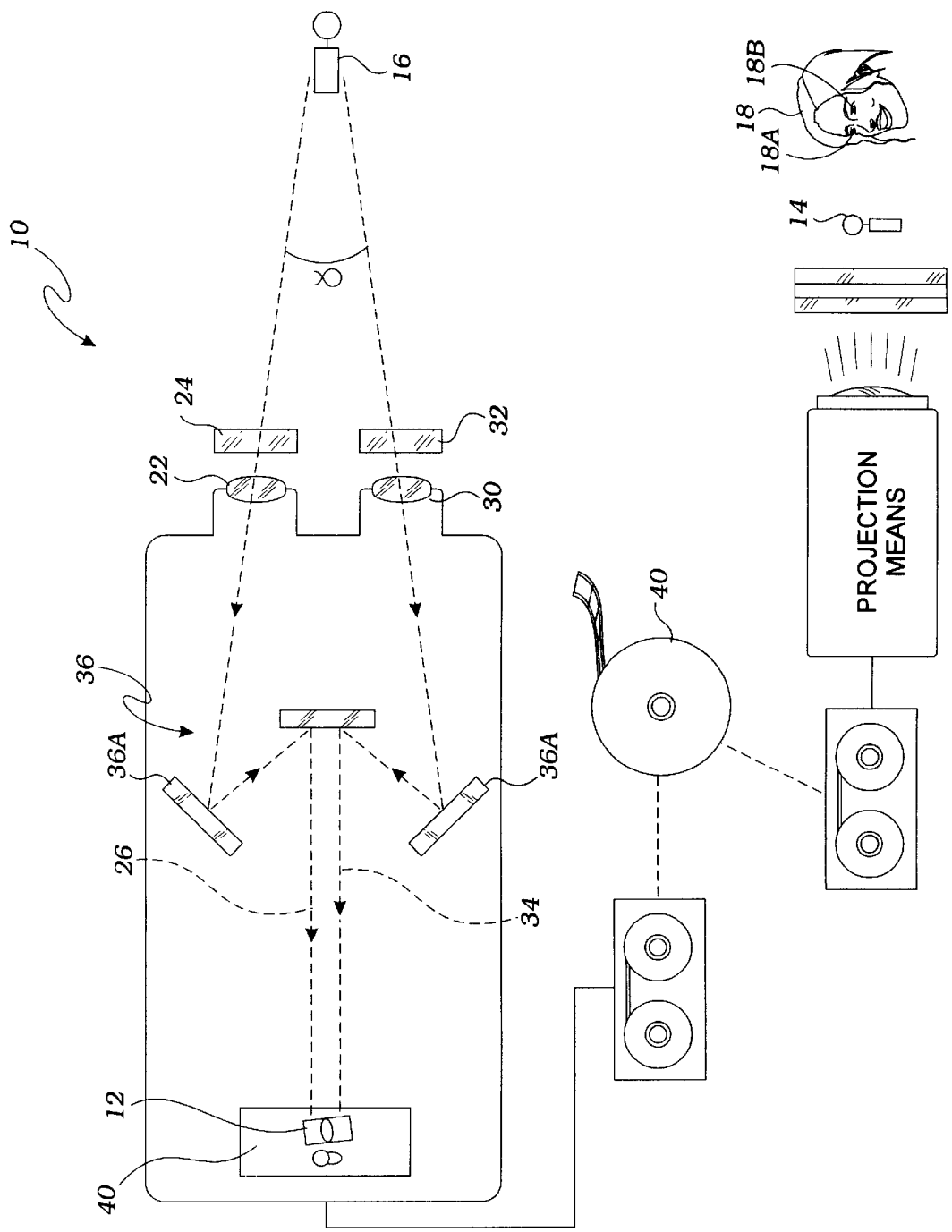
FIG. 1 is a top plan view of a camera used in this invention, the camera illustrating the generation of a 2-D double-squeeze image of an object.

The above described drawing figures illustrate the invention, a 3-D imaging system 10 for projecting a 3-D panoramic illusion 14 of an object 16 to a viewer 18. The 3-D imaging system 10 includes two primary components:

a camera 20 having a first and second anamorphic lenses 22 and 30 that are horizontally spaced and capable of viewing a wide angle panoramic view of the object 16 and capturing the wide angle panoramic view as a 2-D double-squeeze image 12; and a means for projecting 50 such as a movie projector, CRT, or LCD display for projecting the 2-D double-squeeze image 12 through an image separator layer 60 to the viewer 18, causing the viewer 18 to perceive the wide angle panoramic view of the object 16 as the 3-D panoramic illusion 14 located in front of the image separator layer 60. The first anamorphic lens 22 has a red transparent color filter 24 for removing blue light, forming a red color filter image 26 of the object 16. The second anamorphic lens 30 has a blue transparent color filter 32 for removing red light, forming a blue color filter image 34 of the object 16. The red and blue color filter images 26 and 34 are captured together as the 2-D double-squeeze image 12. The 2-D double-squeeze image 12 is then projected by the projecting means 50 through the image separator layer 60. The image separator layer 60 is responsible for separating the red color filter image 26 and the blue color filter image 34 from the 2-D double-squeeze image 12 and directing the red color filter image 26 to one eye 18A of the viewer 18 and the blue color filter image 34 to the other eye 18B of the viewer 18, thereby reproducing the wide angle panoramic view captured by the camera 20 and creating the 3-D panoramic illusion 14 of the object 16. The image separator layer 60 also causes the viewer 18 to perceive the 3-D panoramic illusion 14 as projected in front of the image separator layer 60 and stretched from opposite sides into a wide angle panoramic image.

Camera

As shown in FIG. 1, the camera 20 has a first anamorphic lens 22 horizontally spaced from a second anamorphic lens 30, preferably by approximately 2.5 inches. The first anamorphic lens 22 has a red transparent color filter 24 for removing blue light, forming a red color filter image 26 of the object 16. The second anamorphic lens 30 has a blue transparent color filter 32 for removing red light, forming a blue color filter image 34 of the object 16. It is important to note that, although we refer to the red and blue transparent color filters 24 and 32 as specific to red and blue light, they both allow a portion of the green spectrum as well, so that the combination of the red and blue color filter images 26 and 34 recreate natural white light. The first and second anamorphic lenses 22 and 30 function to capture a wide angle panoramic view which is later uncompressed by the image separator layer 60 as described below. The red and blue transparent color filters 24 and 32 are preferably filter #8 color density.

The camera 20 includes a means for forming 36 a 2-D double-squeeze image 12 of the object 16 from the combination of the red color filter image 26 and the blue color filter image 34. The means for forming 36 the 2-D double-squeeze image 12 is preferably a pair of angled mirrors 36A operably positioned to direct light from the object 16 off a central mirror 36B and onto the means for capturing 40. Such mirror systems are well known by those skilled in the art; and innumerable alternative mirror systems can be devised by those skilled in the art. The means for forming 36 the 2-D double-squeeze image 12 is expressly meant to encompass the innumerable alternative embodiments that are equivalent to the mirror system shown. The means for forming 36 the 2-D double-squeeze image 12 is also expressly meant to encompass the variety of lenses that those skilled in the art may devise to focus the camera 20, increase the clarity of the 2-D double-squeeze image 12, zoom in on the object 16, correct for distortion of the 2-D double-squeeze image 12, or create special effects. Such lens systems are well known in the art of film and photography and should be encompassed within the scope of this patent.

Figure 10:
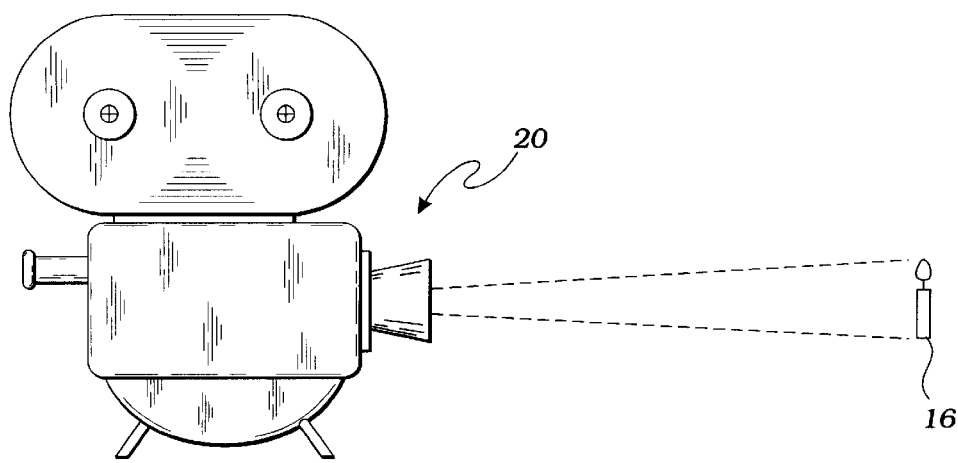
FIG. 10 is a side elevational view of a movie camera embodying the present invention.
Figure 11:
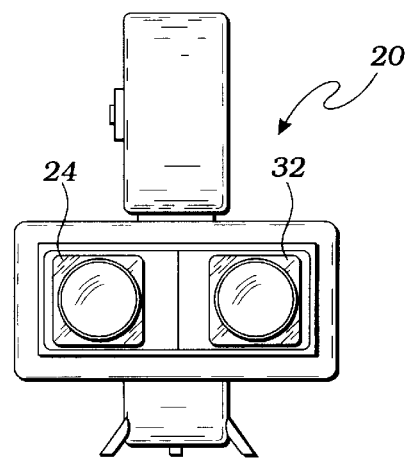
FIG. 11 is a front elevational view thereof.
Figure 12:
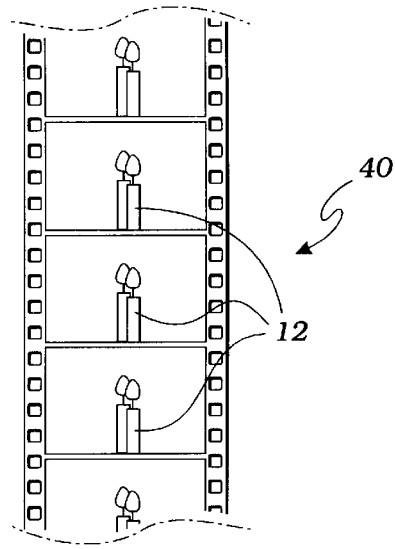
FIG. 12 is a top plan view of a segment of photographic film used in the movie camera.

The camera 20 also includes a means for capturing ("capturing means") 40 the 2-D double-squeeze image 12. Since the 2-D double-squeeze image 12 can be recorded with any conventional technology, the capturing means 40 can be constructed provided by a number of devices well known in the art of film and photography. In one embodiment, shown in FIGS. 10–11, the camera 20 is a movie camera. As shown in FIG. 12, the means for capturing 40 in this embodiment is a photographic film such as is commonly used in similar movie cameras. Such photographic film 40 is, of course, well known, and does not have to be modified to function in the present invention. In another embodiment, the means for capturing 40 is layer of photodetectors (not shown) arranged in a raster grid, such as a charge-coupled device (CCD). The CCD (not shown) is operably connected to a microchip (not shown) which sorts the incoming data, combines it with an audio signal if available, and generates a properly organized signal as required by modern capturing and broadcast standards. The CCD and the operably attached microchip are commonly used in a camcorder, shown in FIGS. 14–15. Since CCDs and their equivalent devices are well known in the art, we will not discuss them in further detail. Furthermore, the storage, transfer, distribution, and broadcast of an image an audio-video image is also well known in the art. These issues are discussed in detail in Eichenlaub, U.S. Pat. No. 4,367,486, Lipton, U.S. Pat. No. 4,56,463, Ikushima et al., U.S. Pat. No. 4,393,400, and Yoshimura, U.S. Pat. No. 4,772,944, hereby incorporated by reference in full.

Projecting Means

The projecting means 50 is provided by any number of visual projection devices known in the art. Since this invention does not require any alterations to be made to the prior art projection devices, we will only discuss the structure of the various projecting devices in general terms, the specific construction of such devices being well known to those skilled in the art. In a first embodiment, shown in FIG. 13, the projecting means 50 is a movie projector operably positioned to project the 2-D double-squeeze image 12 onto the back of a screen 52B and through the image separator layer 60 mounted on the front of the screen 52B. Each of the eyes 18A and 18B of each of the viewers 18 will see one of the two images projected from the screen 52B, and the combination of these two red and blue color filter images 26 and 34 in the mind of the viewer 18 will create the 3-D panoramic illusion 14. The movie projector is designed to project the 2-D double-squeeze image 12 from the photographic film 40 described above. The structure of the movie projector is not discussed herein because the structure and function of the movie projector is well known in the art. In an alternative embodiment, as shown in FIGS. 16–17, the projecting means 50 is a cathode-ray tube ("CRT"); and in yet another embodiment, as shown in FIG. 18, the projecting means 50 is a liquid crystal display ("LCD display"). The LCD display 50 and equivalent devices are well known in the art and serve only to project the 2-D double-squeeze image 12 towards the viewer 18. It is an important benefit of this 3-D imaging system 10 that it will function with the CRT and LCD displays 50 already in use without requiring a change in the television broadcast network to function.

Image Separator Layer

The 2-D double-squeeze image 12 by itself is not in a form that can be viewed by the viewer 18. The viewer 18 needs a way to view the 2-D double-squeeze image 12 on the screen 52B with the naked eye in 3-D. This requirement is met with a thin flat layer of transparent material called the image separator layer 60, shown in FIGS. 7–9. The image separator layer 60 is responsible for separating the red color filter image 26 and the blue color filter image 34 from the 2-D double-squeeze image 12 and directing the red color filter image 26 to one eye 18A of the viewer 18 and the blue color filter image 34 to the other eye 18B of the viewer 18, thereby reproducing the light captured by the camera 20 and creating the 3-D panoramic illusion 14 of the object 16. In addition to separating the 2-D double-squeeze image 12 into two separate images, the red color filter image 26 and the blue color filter image 34, the image separator layer 60 also causes the viewer 18 to perceive the 3-D panoramic illusion 14 as projected in front of the image separator layer 60. This mental trick is explained in detail in Machtig at al., U.S. Pat. No. 5,782,547, hereby incorporated by reference in full. Finally, the image separator layer 60 has anamorphic characteristics that stretch the image from opposite sides, converting the 2-D double-squeeze image 12 into the 3-D panoramic illusion 14.

Figure 7:
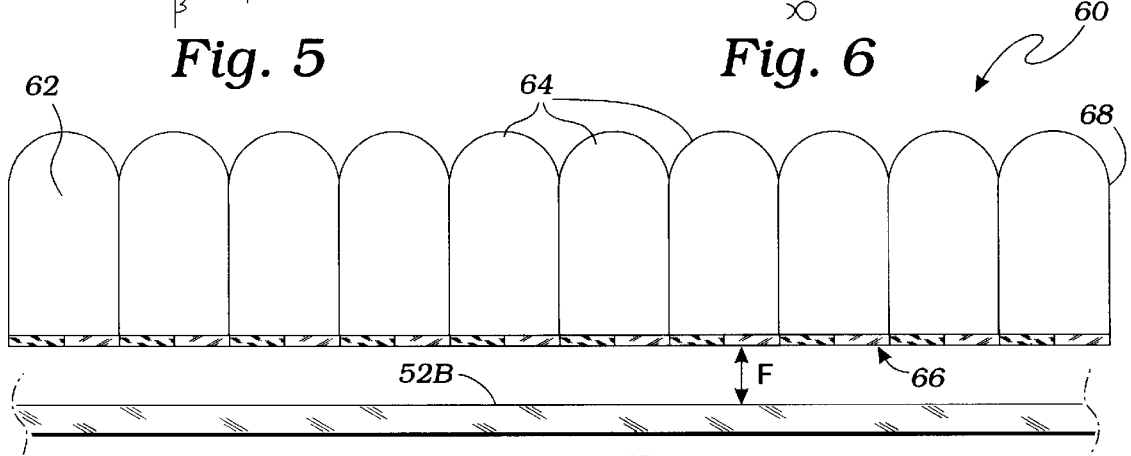
FIG. 7 is a top plan view of the image separator layer.
Figure 8:
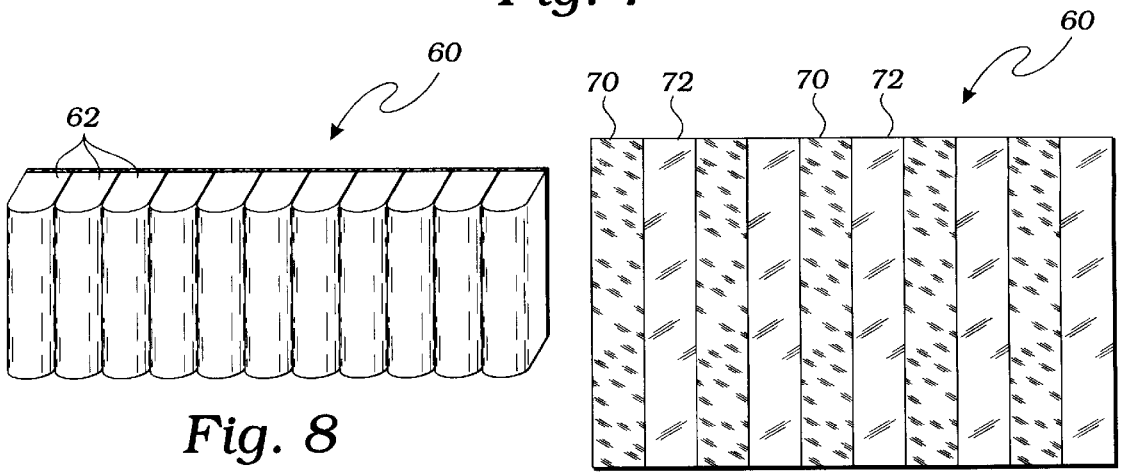
FIG. 8 is a perspective view thereof.
Figure 9:
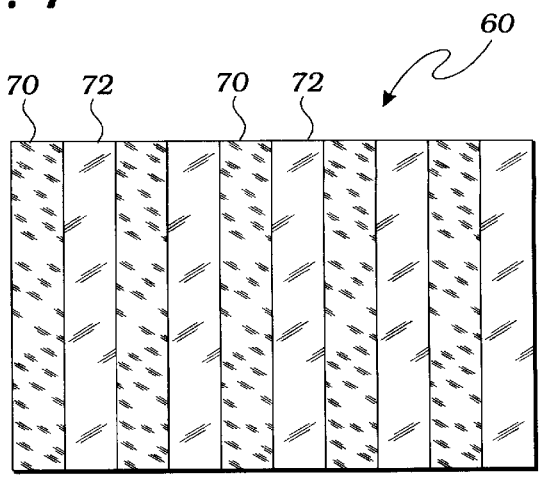
FIG. 9 is a rear elevational view thereof.

As shown in FIGS. 2–9, the image separator layer 60 has a plurality of parallel vertical lenticules 62, each of the plurality of parallel vertical lenticules 62 having a front convex surface 64, a rear planar surface 66, and four flat side surfaces 68. Each of the plurality of parallel vertical lenticules 62 is made of a transparent material such as glass or transparent plastic. As shown in FIGS. 3 and 9, the rear planar surface 66 of each of the parallel vertical lenticules 62 has a red transparent color filter band 70 and a blue transparent color filter band 72 that extending the vertical length of each of the parallel vertical lenticules 62. As shown in FIGS. 7, 16, 17, and 18, the image separator layer 60 is operably positioned in front of the projecting means 50 to project the 2-D double-squeeze image 12 through both the red transparent color filter band 70 and the blue transparent color filter band 72 of one of the plurality of parallel vertical lenticules 62. The red transparent color filter band 70 reproduces the red color filter image 26 and the blue transparent color filter band 72 reproducing the blue color filter image 34 by blocking the other wavelengths of light in the same manner as the red and blue transparent color filters 24 and 32 of the camera 20. The front convex surface 64 directs the red color filter image 26 to one eye 18A of the viewer 18 and directs the blue color filter image 34 to the other eye 18B, thereby causing the viewer 18 to perceive the 3-D panoramic illusion 14 of the object 16 in front of the image separator layer 60.

Figure 13:
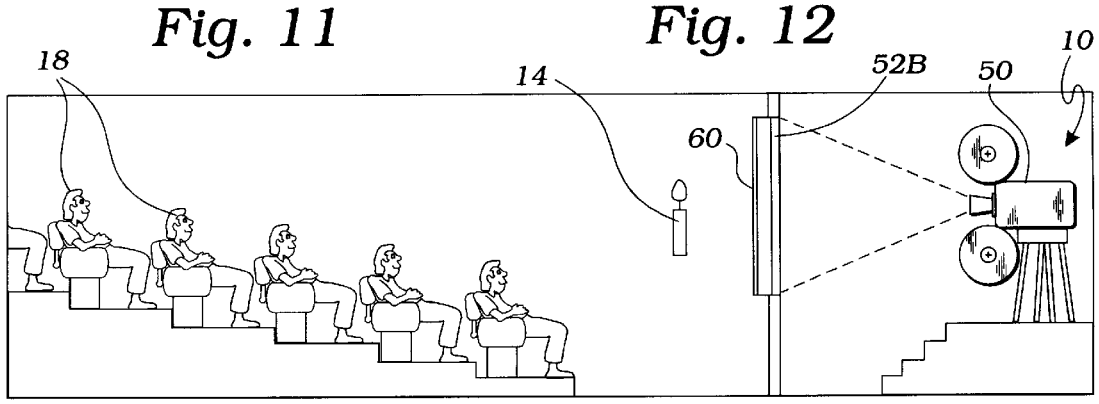
FIG. 13 is a side elevational view of a movie theater having the movie projector operably positioned to project the 2-D double-squeeze image onto a movie screen.

The image separator layer 60 must be operably mounting in front of the projecting means 50. When the projecting means 50 is a CRT (i.e. a television set) 50 or similar display (such as an LCD display), the image separator layer 60 is mounted on a face 52A of the CRT 50, as shown in FIGS. 16 and 17. When the projecting means 50 is a movie projector, the image separator layer 60 is mounted in front of the screen 52B as shown in FIG. 13. In either case, it is important that the image separator layer 60 be parallel to the face 52A of the CRT 50 (or the screen 52B in this alternative embodiment) and separated by a distance equal to the focal length of the image separator layer 60. The focal length of the image separator layer 60 is preferably less than 6 mm, and is most preferably between 3–4 mm.

Figure 5:
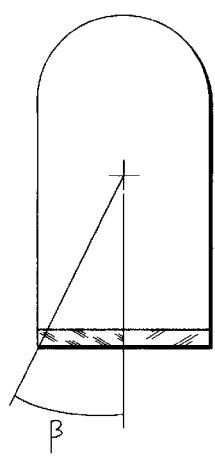
FIG. 5 is a top plan view thereof illustrating the image band angle.
Figure 6:
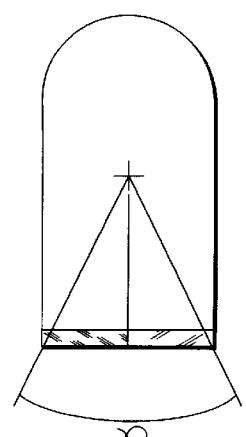
FIG. 6 is a top plan view thereof illustrating the angle of the lenticule.

As shown in FIG. 6, each of the plurality of parallel vertical lenticules 62 has a lenticule viewing angle a that is preferably between 20 and 30 degrees, preferably approximately 20 degrees. In the preferred embodiment, it is not practical to have a lenticule viewing angle α that is less than 20 degrees or greater than 30 degrees. As shown in FIG. 5, in the preferred embodiment each of the plurality of parallel vertical lenticules 62 has a lenticule band width angle β that is approximately 10 degrees. Furthermore, in order for the eyes 18A and 18B of the viewer 18 to properly fuse the red and blue color filter images 26 and 34 together, the proper parallax between the red and blue color filter images 26 and 34 shown on the screen 52B should be maintained. Parallax is the apparent displacement of an object 16 observed. As shown in FIGS. 4A, 4B, and 4C, the angular amount of such displacement (angular parallax displacement γ) is measured between the lines drawn to it from the two different points of observation.

Method of Use

The invention also includes a method for projecting a 3-D panoramic illusion 14 of an object 16 to a viewer 18 using the above-described product. The object 16 is positioned in front of the camera 20 such that light from the object 16 passes through the red transparent color filter 24 and the first anamorphic lens 22 to form the red color filter image 26 and the light passes through the blue transparent color filter 32 and the second anamorphic lens 30 to form the blue color filter image 34. The red color filter image 26 and the blue color filter image 34 are directed with the forming means 36 to form the 2-D double-squeeze image 12 on the means for capturing 40. As described above, the forming means 36 is preferably at least one mirror used to combine the red color filter image 26 and the blue color filter image 34 to form the 2-D double-squeeze image 12 of the object 16 onto the capturing means 40. The 2-D double-squeeze image 12 is then recorded with the capturing means 40 and transferred to the projecting means 50. The 2-D double-squeeze image 12 can be recorded on a variety of media such as magnetic or optical storage disks or tapes 42 as known in the art, or transmitted directly to the projecting means 50 via a computer connection or a television broadcast.

The projecting means 50 described above is provided and the image separator layer 60 is operably mounting in front of the projecting means 50. In practice, the image separator layer 60 is mounted on the face 52A of the CRT 50 or similar display (such as an LCD display). When the projecting means 50 is a movie projector as shown in FIG. 7, the image separator layer 60 is mounted in front of the screen 52B. In either case, it is important that the image separator layer 60 be separated from the face 52A of the CRT 50 (or the screen 52B in this embodiment) by a distance equal to the focal length of the image separator layer 60. The focal length of the image separator layer 60 can be as large as 6 mm, but it is preferably between 3–4 mm. The viewer 18 is positioned in front of the image separator layer 60. The projecting means 50 is used to project the 2-D double-squeeze image 12 through both the red and blue transparent color filter bands 70 and 72 of the image separator layer 60. The red transparent color filter band 70 reproduces the red color filter image 26 and the blue transparent color filter band 72 reproduces the blue color filter image 34. The front convex surface 64 then directs the red color filter image 26 to one eye 18A of the viewer 18 and directs the blue color filter image 34 to the other eye 18B of the viewer 18, thereby causing the viewer 18 to perceive the 3-D panoramic illusion 14 of the object 16 in front of the image separator layer 60.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A 3-D imaging system for projecting a 3-D panoramic illusion of an object to a viewer, the 3-D imaging system comprising:

a first anamorphic lens having a red transparent color filter, the first anamorphic lens being horizontally spaced from a second anamorphic lens having a blue transparent color filter, the first anamorphic lens forming a red color filter image of the object and the second anamorphic lens forming a blue color filter image of the object;

a means for forming a 2-D double-squeeze image of the object from the combination of the red color filter image and the blue color filter image;

a means for capturing the 2-D double-squeeze image;

a means for projecting the 2-D double-squeeze image as captured by the capturing means; and an image separator layer having a plurality of parallel vertical lenticules, each of the plurality of parallel vertical lenticules having a front convex surface and a rear planar surface, each of the rear planar surfaces having a red transparent color filter band and a blue transparent color filter band, each of the bands extending the vertical length of each of the plurality of parallel vertical lenticules, the image separator layer being operably positioned so that the projecting means projects the 2-D double-squeeze image through the red and blue transparent color filter bands of the plurality of parallel vertical lenticules, the red transparent color filter band reproducing the red color filter image and the blue transparent color filter band reproducing the blue color filter image, the front convex surface directing the red color filter image to one eye of the viewer and directing the blue color filter image to the second eye of the viewer, thereby causing the viewer to perceive the 3-D panoramic illusion of the object in front of the image separator layer.

2. The 3-D imaging system of claim 1 wherein the means for forming the 2-D double-squeeze image is a pair of angled mirrors operably positioned to direct light from the object off a central mirror and onto the capturing means.

3. The 3-D imaging system of claim 2 wherein the capturing means is a photographic film.

4. The 3-D imaging system of claim 2 wherein the capturing means is layer of photodetectors.

5. The 3-D imaging system of claim 1 wherein the projecting means is a movie projector operably positioned to project the 2-D double-squeeze image onto a screen.

6. The 3-D imaging system of claim 1 wherein the projecting means is a cathode-ray tube having a face.

7. The 3-D imaging system of claim 1 wherein the projecting means is a LCD display having a face.

8. The 3-D imaging system of claim 1 wherein the image separator layer is mounted within 6 mm from the projecting means.

9. The 3-D imaging system of claim 8 wherein the image separator layer is mounted within 3–4 mm from the projecting means.

10. The 3-D imaging system of claim 1 wherein the image separator layer stretches the 2-D double-squeeze image from both ends to provide a wide angle view of the 3-D panoramic illusion.

11. A method for projecting a 3-D panoramic illusion of an object to a viewer, the method comprising the steps of:

a) providing a camera having:
      a first anamorphic lens having a red transparent color filter, the first anamorphic lens being horizontally spaced from a second anamorphic lens having a blue transparent color filter;
      a means for forming a 2-D double-squeeze image; and
      a means for capturing the 2-D double-squeeze image;

b) providing a means for projecting the 2-D double-squeeze stored in the capturing means;

c) providing an image separator layer having a plurality of parallel vertical lenticules, each of the plurality of parallel vertical lenticules having a front convex surface and a rear planar surface, the rear planar surface having a red transparent color filter band and a blue transparent color filter band, each of the bands extending the vertical length of each of the plurality of parallel vertical lenticules;

d) positioning the object in front of the camera such that light from the object passes through the red transparent color filter to form a red color filter image and the light passes through the blue transparent color filter to form a blue color filter image;

e) directing the red color filter image and the blue color filter image with the forming means to form the 2-D double-squeeze image on the capturing means;

f) capturing the 2-D double-squeeze image of the object;

g) transferring the 2-D double-squeeze image to the projecting means;

h) operably mounting the image separator layer in front of the projecting means;

i) positioning the viewer in front of the image separator layer; and j) projecting the 2-D double-squeeze image from the projecting means through the red transparent color filter band and the blue transparent color filter band of one of the plurality of parallel vertical lenticules, the red transparent color filter band reproducing the red color filter image and the blue transparent color filter band reproducing the blue color filter image, the front convex surface directing the red color filter image to one eye of the viewer and directing the blue color filter image to the second eye of the viewer, thereby causing the viewer to perceive the 3-D panoramic illusion of the object in front of the image separator layer.

12. The method of claim 11 wherein the means for forming the 2-D double-squeeze image is a pair of angled mirrors operably positioned to direct light from the object off a central mirror and onto the capturing means.

13. The method of claim 11 wherein the capturing means is a photographic film.

14. The method of claim 11 wherein the capturing means is layer of photodetectors.

15. The method of claim 11 wherein the projecting means is a movie projector operably positioned to project the 2-D double-squeeze image onto a screen.

16. The method of claim 11 wherein the projecting means is a cathode-ray tube.

17. The method of claim 11 wherein the projecting means is a LCD screen.

* * * * *